United States Patent
Chisaka et al.

(10) Patent No.: US 10,038,347 B2
(45) Date of Patent: Jul. 31, 2018

(54) AUTOMOTIVE ROTARY ELECTRIC MACHINE

(71) Applicant: Mitsubishi Electric Corporation, Tokyo (JP)

(72) Inventors: Kazuhiro Chisaka, Tokyo (JP); Yoshihiro Shinosaka, Tokyo (JP); Naoki Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 14/917,637

(22) PCT Filed: Oct. 31, 2013

(86) PCT No.: PCT/JP2013/079626
§ 371 (c)(1),
(2) Date: Mar. 9, 2016

(87) PCT Pub. No.: WO2015/063938
PCT Pub. Date: May 7, 2015

(65) Prior Publication Data
US 2016/0226328 A1  Aug. 4, 2016

(51) Int. Cl.
*H02K 5/22* (2006.01)
*H02K 11/00* (2016.01)
(Continued)

(52) U.S. Cl.
CPC ............... *H02K 3/28* (2013.01); *H02K 5/225* (2013.01); *H02K 11/05* (2016.01)

(58) Field of Classification Search
CPC ................... H02K 5/225; H02K 11/05; H02K 11/04–11/049
(Continued)

(56) References Cited

U.S. PATENT DOCUMENTS

| 2001/0054853 A1* | 12/2001 | Hayashi | ................. H02K 5/225 310/71 |
| 2005/0159041 A1* | 7/2005 | Holliday | ............... H01R 4/5025 439/500 |
| 2006/0267424 A1 | 11/2006 | Imai et al. | |

FOREIGN PATENT DOCUMENTS

| JP | 04-165949 A | 6/1992 |
| JP | 09-046961 A | 2/1997 |

(Continued)

OTHER PUBLICATIONS

Machine Translation, IMAI, JP 09046961 A, Feb. 1997.*
(Continued)

*Primary Examiner* — Thomas Truong
(74) *Attorney, Agent, or Firm* — Sughrue Mion, PLLC; Richard C. Turner (57) ABSTRACT

An output terminal portion includes: an output terminal that includes: a shaft portion on which an external screw thread portion is formed; and a head portion; and an intermediary member that includes: a fastening seat on a first axial end of which a nut portion is formed integrally, and that is mounted so as to be fitted over the shaft portion such that a second axial end protrudes axially out of a bushing, the bushing is mounted to the intermediary member such that axial movement of the bushing is constrained, and an external output wire is mounted to a second axial end surface of the fastening seat in a state of contact by a fastening force from a fixing nut that is screwed onto the external screw thread portion such that the external output wire is fixed by fastening between the fixing nut and the fastening seat.

5 Claims, 11 Drawing Sheets

(51) Int. Cl.
*H02K 3/28* (2006.01)
*H02K 11/05* (2016.01)

(58) Field of Classification Search
USPC .................................................. 310/68 D, 71
See application file for complete search history.

(56) References Cited

FOREIGN PATENT DOCUMENTS

| JP | 09046961 A | * | 2/1997 |
| JP | 4110439 B2 | | 7/2008 |
| JP | 2008-263702 A | | 10/2008 |
| JP | 2008263702 A | * | 10/2008 |

OTHER PUBLICATIONS

Machine Translation, UCHIUMI, JP 2008263702 A, Oct. 2008.*
Communication dated Jun. 13, 2017, issued by the European Patent Office in counterpart application No. 13896825.0.
International Search Report of PCT/JP2013/079626 dated Jan. 21, 2014.

* cited by examiner

AUTOMOTIVE ROTARY ELECTRIC MACHINE

CROSS REFERENCE TO RELATED APPLICATIONS

This is a National Stage of International Application No. PCT/JP2013/079626 filed Oct. 31, 2013, the contents of which are incorporated herein by reference in its entirety.

TECHNICAL FIELD

The present invention relates to an automotive rotary electric machine such as an automotive alternator, etc.

BACKGROUND ART

Conventional automotive alternators have included: an output terminal portion that is fastened to a positive (+) output end of a rectifying circuit and that protrudes externally through an insertion aperture on a rear cover; and a bushing that is fitted into the insertion aperture of the rear cover and that insulates and protects the output terminal portion, wherein: the output terminal portion has: a bolt-shaped terminal that has an external screw thread portion; and an output terminal portion fixing nut that fastens the bolt-shaped terminal to the positive (+) output end of the rectifying circuit; an end surface of the output terminal portion fixing nut constitutes a seat that is formed further axially outward than the bushing when fixed to the rear cover; and an output wire that is fastened to the output terminal portion by placing the output wire in close contact with the seat by screwing the nut onto the external screw thread portion of the bolt-shaped terminal (see Patent Literature 1, for example).

CITATION LIST

Patent Literature

Patent Literature 1: Japanese Patent No. 4110439 (Gazette)

SUMMARY OF THE INVENTION

Problem to be Solved by the Invention

In conventional automotive alternators, the bushing is fixed to the rear cover, which has little rigidity. Thus, because the bushing moves axially when the output wire is being mounted onto the bolt-shaped terminal, one problem has been that the work of mounting the output wire is complicated, reducing mounting workability.

The present invention aims to solve the above problems and an object of the present invention is to provide an automotive rotary electric machine that can improve mounting workability of an output wire.

Means for Solving the Problem

An automotive rotary electric machine according to the present invention includes: a rectifier that is fixed to an axially outer end surface of a bracket; a protective cover that is mounted to the bracket so as to cover the rectifier; an output terminal portion that is fastened to a positive electrode output end of the rectifier, and that protrudes axially out of a penetrating aperture that is formed on the protective cover; and a bushing that is inserted into the penetrating aperture, and that is also mounted to the output terminal portion to insulate and protect the output terminal portion. The output terminal portion includes: an output terminal that includes: a shaft portion on which an external screw thread portion is formed; and a head portion that is formed integrally on a first axial end of the shaft portion; and an intermediary member that includes: a nut portion that is screwed onto the external screw thread portion to fix the positive electrode output end by fastening against the head portion; and a fastening seat on a first axial end of which the nut portion is formed integrally, and that is mounted so as to be fitted over the shaft portion such that a second axial end protrudes axially out of the bushing, the bushing is mounted to the intermediary member such that axial movement of the bushing is constrained, and an external output wire is mounted to a second axial end surface of the fastening seat in a state of contact by a fastening force from a fixing nut that is screwed onto the external screw thread portion such that the external output wire is fixed by fastening between the fixing nut and the fastening seat.

Effects of the Invention

According to the present invention, because the bushing is held by an intermediary member that has increased rigidity, the bushing does not move when the external output wire is being mounted to the output terminal portion, facilitating the work of mounting the external output wire, and improving mounting workability.

DESCRIPTION OF EMBODIMENTS

Embodiment 1

Figure 1:
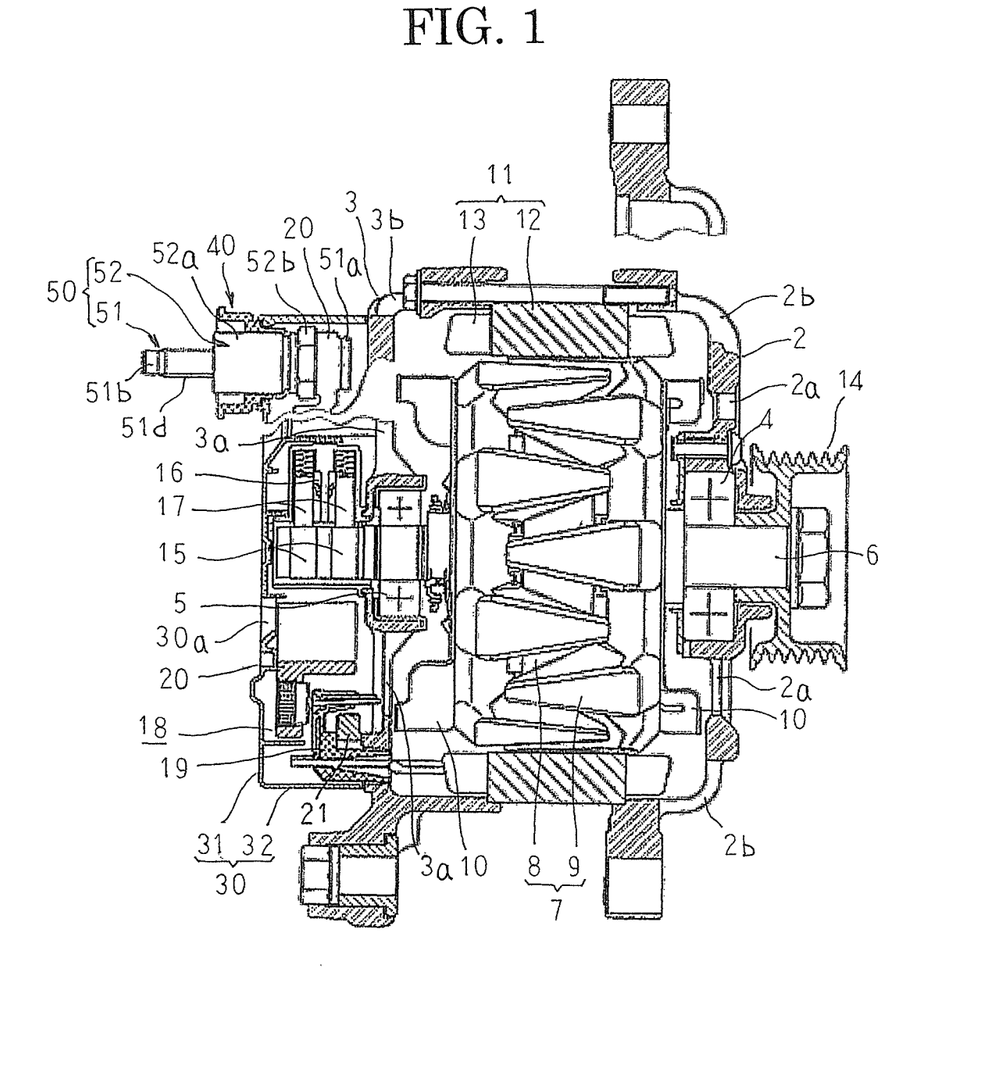
FIG. 1 is a longitudinal cross section that shows an automotive alternator according to Embodiment 1 of the present invention.
Figure 2:
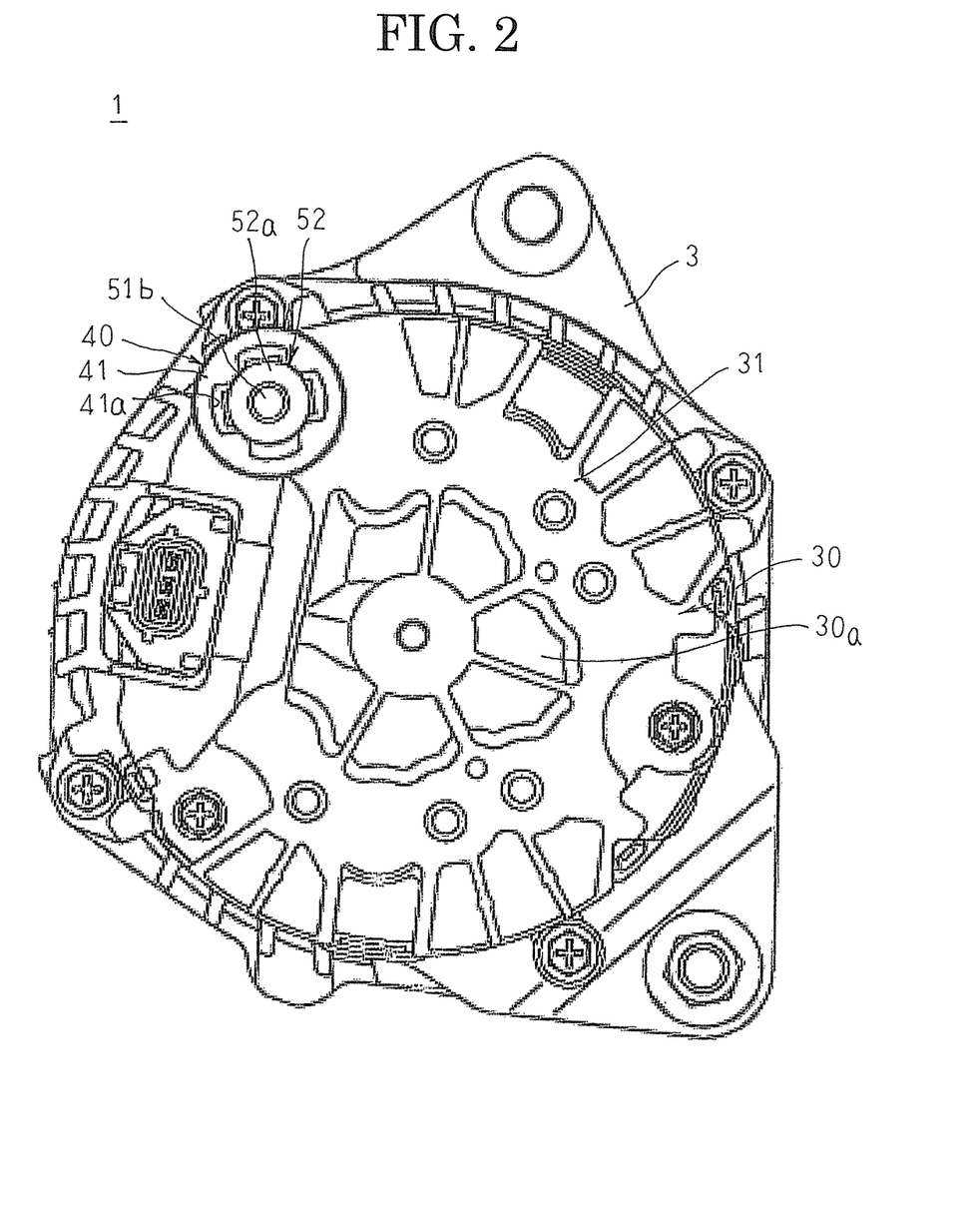
FIG. 2 is an end elevation that shows the automotive alternator according to Embodiment 1 of the present invention when viewed from a rear end.

FIG. 1 is a longitudinal cross section that shows an automotive alternator according to Embodiment 1 of the present invention, and FIG. 2 is an end elevation that shows the automotive alternator according to Embodiment 1 of the present invention when viewed from a rear end.

In FIGS. 1 and 2, an automotive alternator 1 that functions as an automotive rotary electric machine includes: a front bracket 2 and a rear bracket 3 that are each made of aluminum in an approximate cup shape; a rotor 7 that is fixed to a rotating shaft 6 that is rotatably supported in the front bracket 2 and the rear bracket 3 by means of bearings 4 and 5 so as to be rotatably disposed inside the front bracket 2 and the rear bracket 3; and a stator 11 that is fixed to the front bracket 2 and the rear bracket 3 so as to surround an outer circumference of the rotor 7 so as to have a constant air gap relative to the rotor 7.

The rotor 7 includes: a field coil 8 that generates magnetic flux on passage of an excitation current; a pole core 9 that is disposed so as to cover the field coil 8, and in which magnetic poles are formed by the magnetic flux; and the rotating shaft 6. The pole core 9 is fixed to the rotating shaft 6, which passes through a central position thereof. In addition, fans 10 are fixed to the pole core 9 on two axial end surfaces.

The stator 11 includes: an annular stator core 12; and a stator coil 13 that is mounted to the stator core 12, and in which an alternating current arises due to changes in magnetic flux from a field coil 8 that accompany rotation of the rotor 7. The stator 11 is held by the front bracket 2 and the rear bracket 3 such that two end surfaces of the stator core 12 are clamped by the front bracket 2 and the rear bracket 3 from two axial ends.

The automotive alternator 1 also includes: a pulley 14 that is fixed to an end of the rotating shaft 6 that protrudes out of the front bracket 2; a pair of slip rings 15 that are fixed to an end of the rotating shaft 6 that protrudes out of the rear bracket 3, and that supply electric current to the field coil 8; a pair of brushes 17 that are housed inside a brush holder 16 that is disposed axially outside the rear bracket 3, and that slide on each of the slip rings 14; a rectifier 18 that is disposed axially outside the rear bracket 3, and that rectifies alternating currents that are generated in the stator coil 13 into direct current; a voltage regulator (not shown) that is disposed axially outside the rear bracket 3, and that adjusts magnitudes of alternating-current voltages that are generated in the stator coil 13; a resin rear cover 30 that functions as a protective cover, that is prepared so as to have a cup shape, and that is mounted to the rear bracket 3 so as to cover the brush holder 16, the rectifier 18, and the voltage regulator from axially outside the rear bracket 3; an output terminal portion 50 that outputs electric power that is generated by the automotive alternator 1 by means of the rectifier 18; and a bushing 40 that is mounted to the output terminal portion 50, and that insulates and protects the output terminal portion 50.

The rectifier 18 includes: a circuit board 19; and positive electrode radiating fins 20 and negative electrode radiating fins 21 that are each produced using a material that has good thermal conduction such as aluminum, etc., and to which rectifying elements are mounted. The rectifying elements 30 that are mounted to the positive electrode radiating fins 20 and the negative electrode radiating fins 21 are connected so as to configure a predetermined bridge circuit by means of electrical conductors that are insert-molded into the circuit board 19. The rectifier 18 is mounted to the rear bracket 3 by the positive electrode radiating fins 20, the circuit board 19, and the negative electrode radiating fins 21 being stacked and fixed together on an axially outer end surface of the rear bracket 3 by fastening fixing screws (not shown).

A plurality of front-end air intake apertures 2a are formed on a bottom portion of the front bracket 2, and a plurality of front-end air discharge apertures 2b are formed on an edge portion of the front bracket 2. A plurality of rear-end air intake apertures 3a are formed on a bottom portion of the rear bracket 3, and a plurality of rear-end air discharge apertures 3b are formed on an edge portion of the rear bracket 3. A plurality of air intake apertures 30a are formed on a bottom portion of the rear cover 30 so as to face the rectifier 18, and the voltage regulator, etc.

In the automotive alternator 1 that has been configured in this manner, an electric current is supplied from a battery (not shown) through the brushes 17 and the slip rings 15 to the field coil 8 to generate magnetic flux. Claw portions of the pole core 9 are magnetized by this magnetic flux so as to have different polarity alternately in a circumferential direction. At the same time, rotational torque from an engine is transferred to the shaft 6 by means of a belt (not shown) and the pulley 14 to rotate the rotor 7. Thus, a rotating magnetic field is applied to the stator coil 13, generating electromotive forces in the stator coil 13. The alternating currents that are generated by these electromotive forces are rectified by means of the rectifier 18, and then outputted through the output terminal portion 50.

Then, at the front end, air is sucked into the front bracket 2 through the front-end air intake apertures 2a due to rotation of the fans 10, and flows to a vicinity of the pole core 9, is then deflected centrifugally by the fans 10, cools a front-end coil end group of the stator coil 13, and is discharged externally through the front-end air discharge apertures 2b.

At the same time, at the rear end, air is sucked into the rear cover 30 through the air intake apertures 30a of the rear cover 30 due to rotation of the fans 10, and cools the rectifier 18 and the voltage regulator, and then flows into the rear bracket 3 through the rear-end air intake apertures 3a. Then, the air that has flowed into the rear bracket 3 flows to a vicinity of the pole core 9, is then deflected centrifugally by the fans 10, cools a rear-end coil end group of the stator coil 13, and is discharged externally through the rear-end air discharge aperture 3b.

Figure 3:
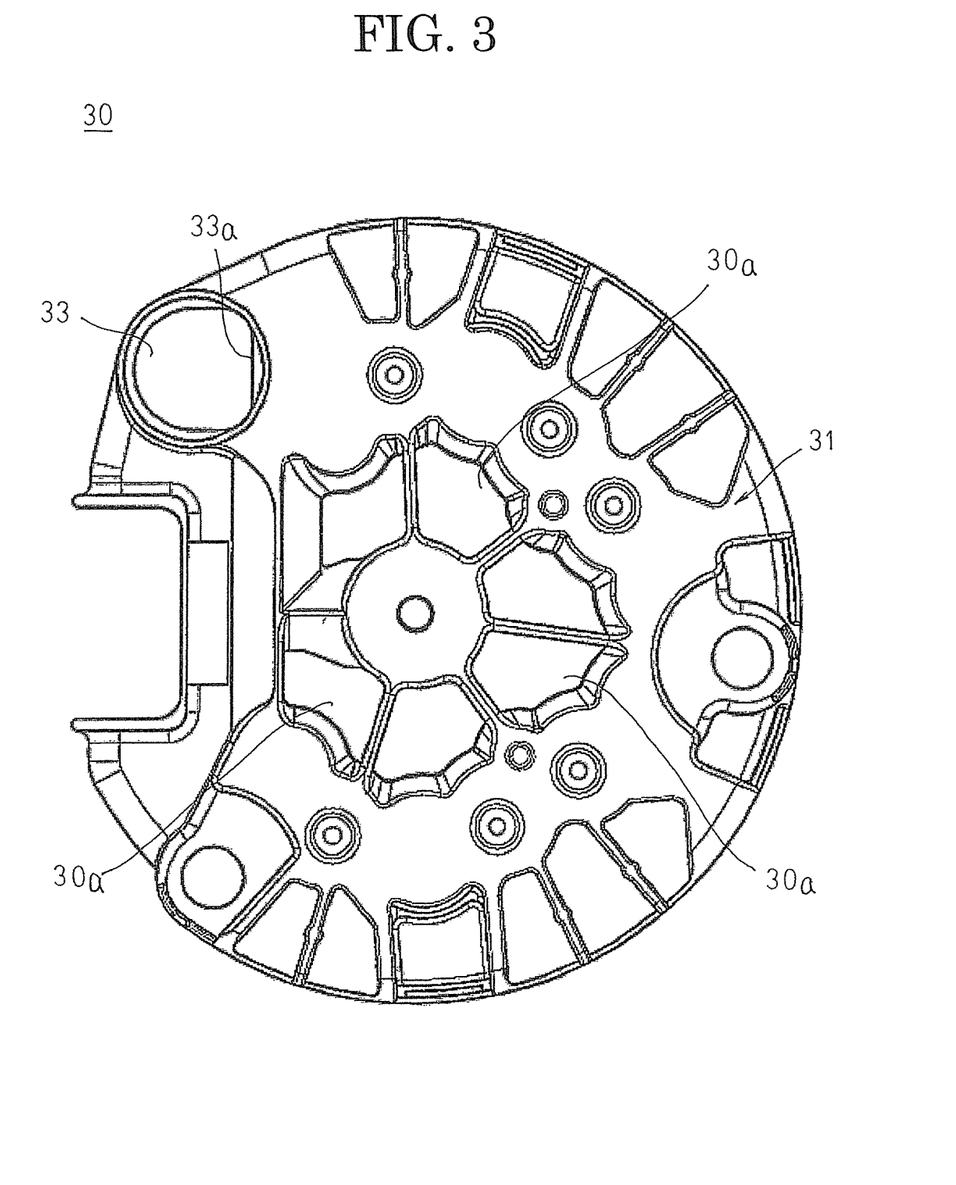
FIG. 3 is a front elevation that shows a rear cover that is used in the automotive alternator according to Embodiment 1 of the present invention.
Figure 4:
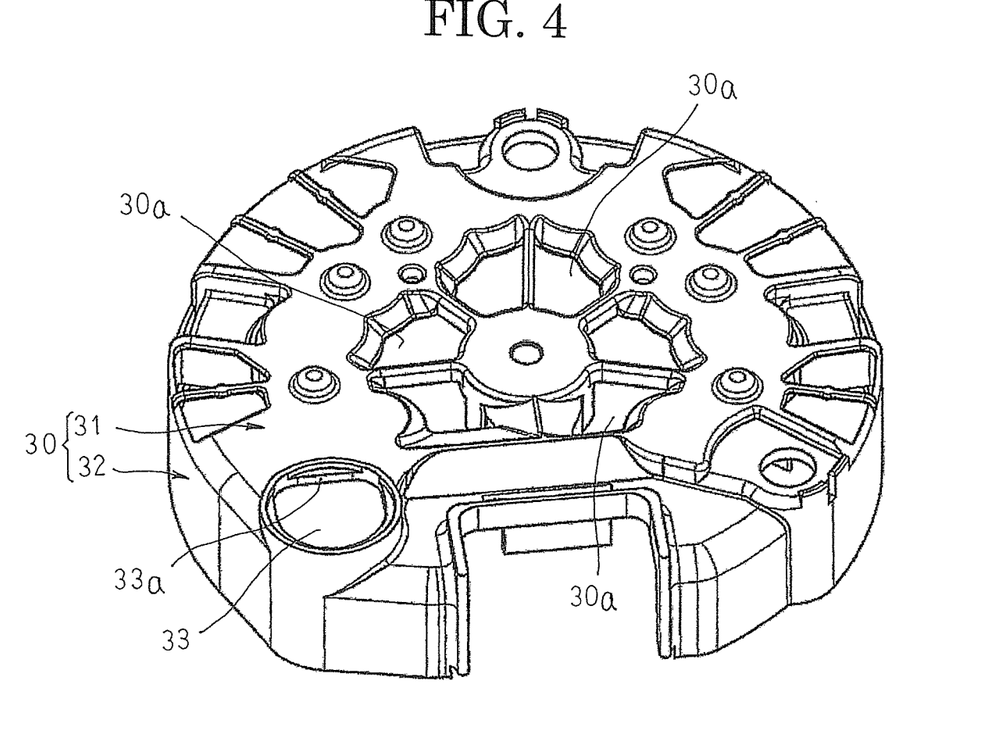
FIG. 4 is an oblique projection that shows the rear cover that is used in the automotive alternator according to Embodiment 1 of the present invention when viewed from obliquely in front.
Figure 5:
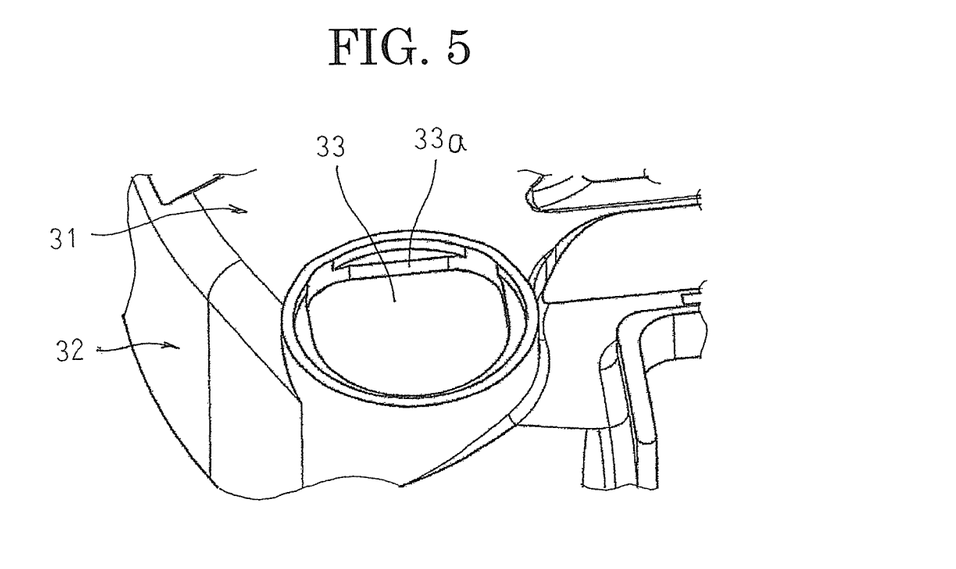
FIG. 5 is a partial oblique projection that shows a vicinity of a penetrating aperture of the rear cover that is used in the automotive alternator according to Embodiment 1 of the present invention.
Figure 7:
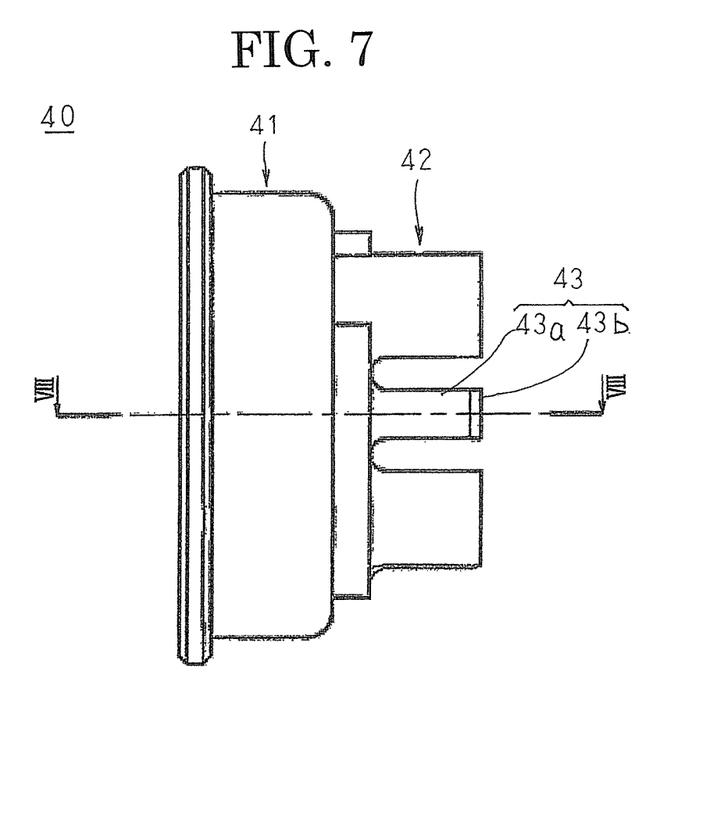
FIG. 7 is a side elevation that shows a bushing that is used in the automotive alternator according to Embodiment 1 of the present invention.
Figure 8:
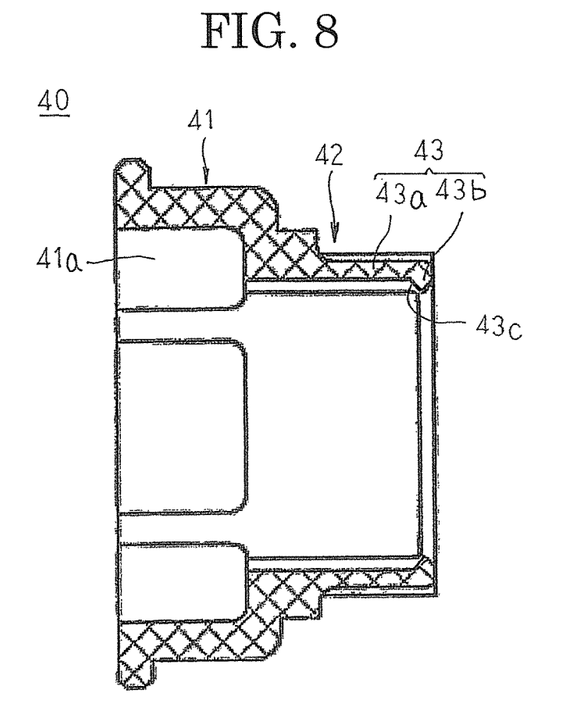
FIG. 8 is a cross section that is taken along Line VIII-VIII in FIG. 7 so as to be viewed in the direction of the arrows.
Figure 9:
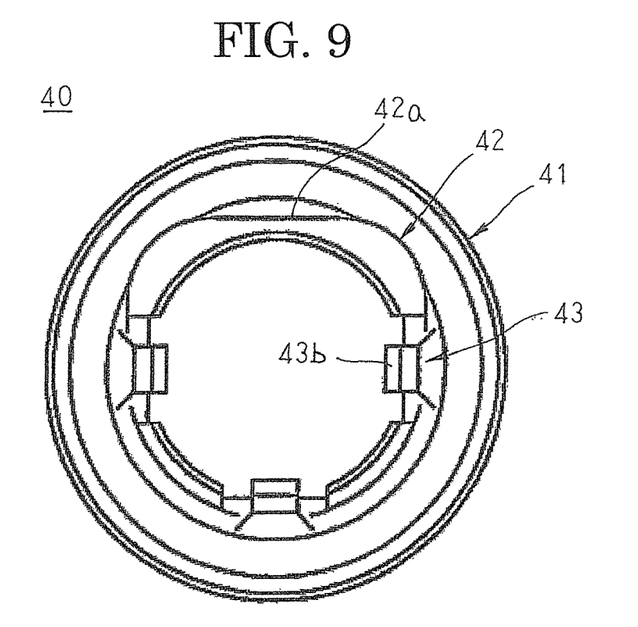
FIG. 9 is a rear elevation that shows the bushing that is used in the automotive alternator according to Embodiment 1 of the present invention.
Figure 10:
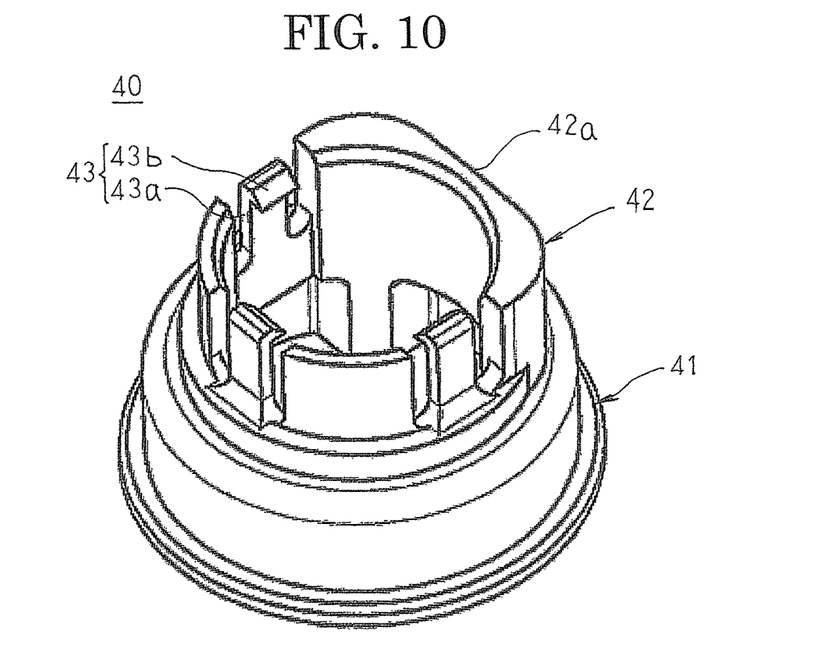
FIG. 10 is an oblique projection that shows the bushing that is used in the automotive alternator according to Embodiment 1 of the present invention when viewed from obliquely behind.
Figure 11:
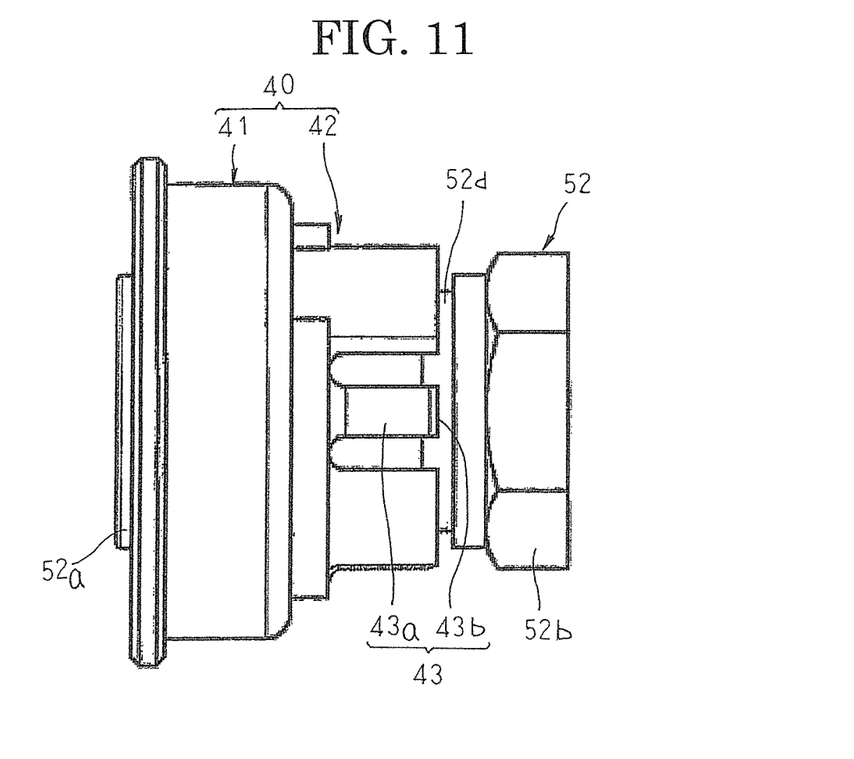
FIG. 11 is a side elevation that shows a state in which the bushing is mounted to an intermediary member in the automotive alternator according to Embodiment 1 of the present invention.
Figure 12:
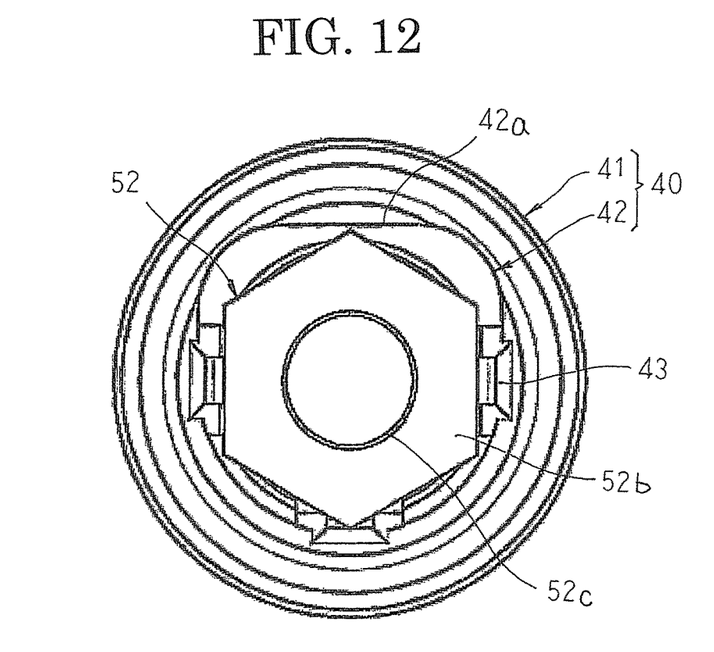
FIG. 12 is a rear elevation that shows the state in which the bushing is mounted to the intermediary member in the automotive alternator according to Embodiment 1 of the present invention.
Figure 13:
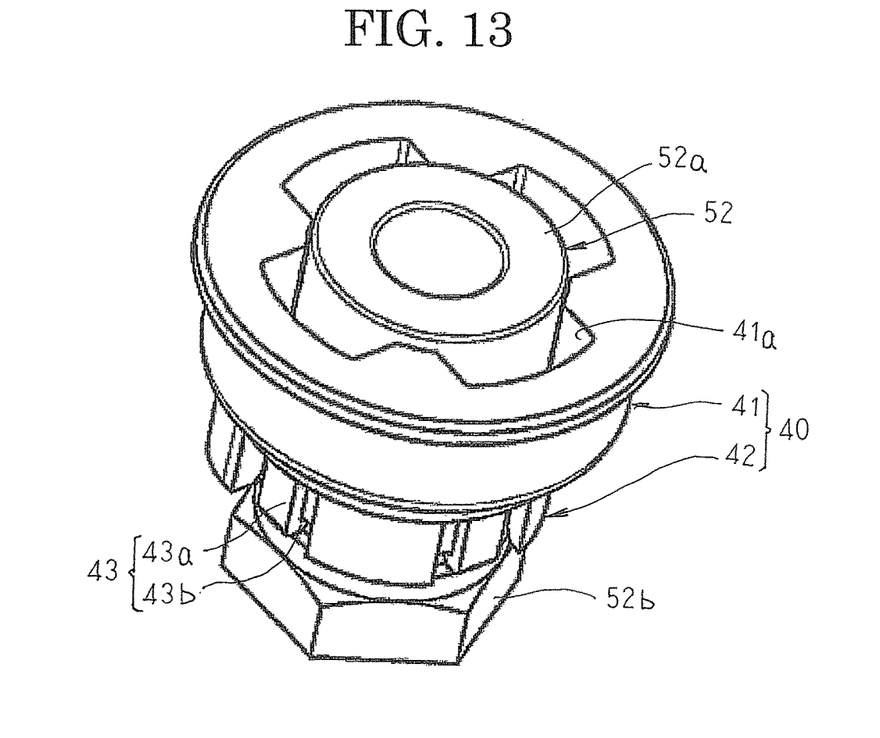
FIG. 13 is an oblique projection that shows the state in which the bushing is mounted to the intermediary member in the automotive alternator according to Embodiment 1 of the present invention when viewed from obliquely in front.
Figure 14:
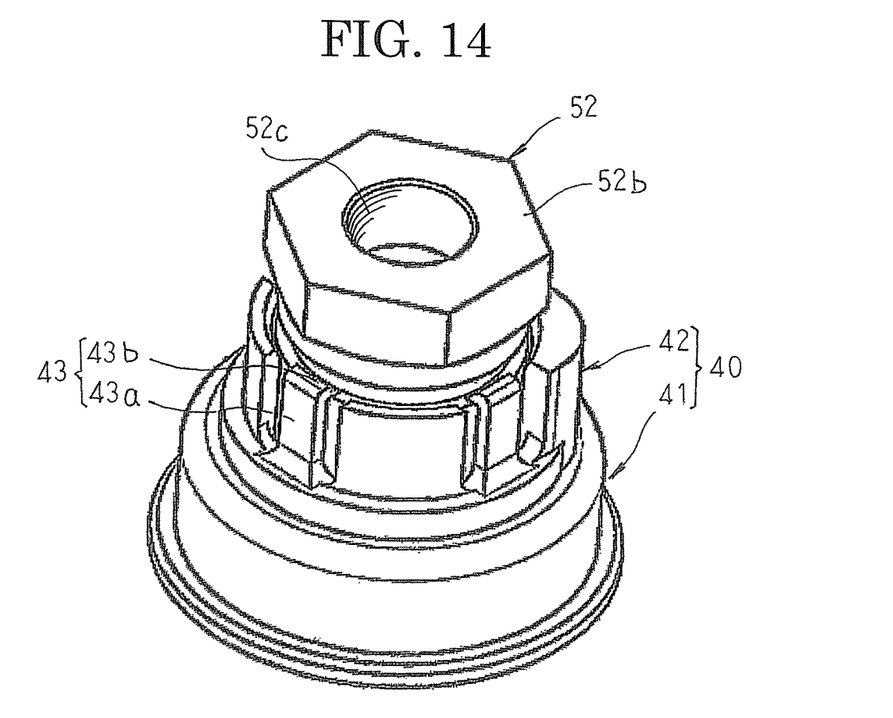
FIG. 14 is an oblique projection that shows the state in which the bushing is mounted to the intermediary member in the automotive alternator according to Embodiment 1 of the present invention when viewed from obliquely behind.
Figure 15:
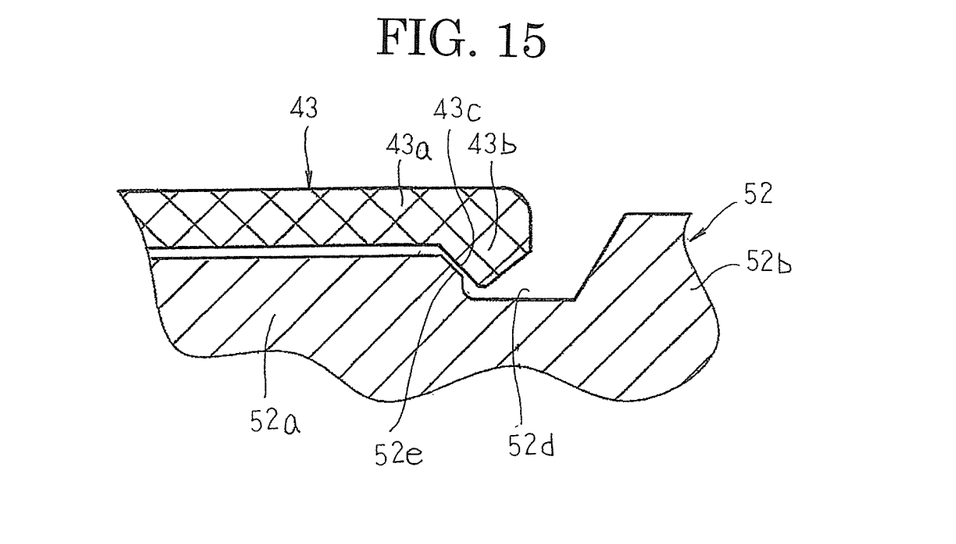
FIG. 15 is a partial cross section that explains a state of engagement between the bushing and the intermediary member in the automotive alternator according to Embodiment 1 of the present invention.

Next, configuration and mounting construction of the rear cover 30, the bushing 40, and the output terminal portion 50 will be explained with reference to FIGS. 3 through 14. Here, FIG. 3 is a front elevation that shows a rear cover that is used in the automotive alternator according to Embodiment 1 of the present invention, FIG. 4 is an oblique projection that shows the rear cover that is used in the automotive alternator according to Embodiment 1 of the present invention when viewed from obliquely in front, FIG. 5 is a partial oblique projection that shows a vicinity of a penetrating aperture of the rear cover that is used in the automotive alternator according to Embodiment 1 of the present invention, FIG. 6 is a partial cross section that shows a vicinity of an output terminal portion in the automotive alternator according to Embodiment 1 of the present invention, FIG. 7 is a side elevation that shows a bushing that is used in the automotive alternator according to Embodiment 1 of the present invention, FIG. 8 is a cross section that is taken along Line VIII-VIII in FIG. 7 so as to be viewed in the direction of the arrows, FIG. 9 is a rear elevation that shows the bushing that is used in the automotive alternator according to Embodiment 1 of the present invention, FIG. 10 is an oblique projection that shows the bushing that is used in the automotive alternator according to Embodiment 1 of the present invention when viewed from obliquely behind, FIG. 11 is a side elevation that shows a state in which the bushing is mounted to an intermediary member in the automotive alternator according to Embodiment 1 of the present invention, FIG. 12 is a rear elevation that shows the state in which the bushing is mounted to the intermediary member in the automotive alternator according to Embodiment 1 of the present invention, FIG. 13 is an oblique projection that shows the state in which the bushing is mounted to the intermediary member in the automotive alternator according to Embodiment 1 of the present invention when viewed from obliquely in front, FIG. 14 is an oblique projection that shows the state in which the bushing is mounted to the intermediary member in the automotive alternator according to Embodiment 1 of the present invention when viewed from obliquely behind, and FIG. 15 is a partial cross section that explains a state of engagement between the bushing and the intermediary member in the automotive alternator according to Embodiment 1 of the present invention.

Figure 6:
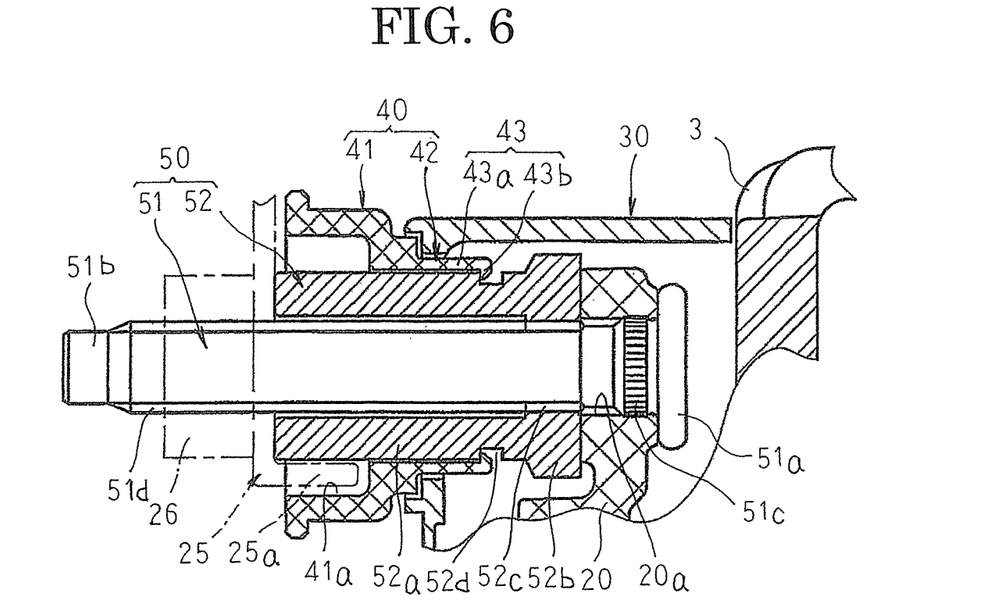
FIG. 6 is a partial cross section that shows a vicinity of an output terminal portion in the automotive alternator according to Embodiment 1 of the present invention.

As shown in FIG. 6, the output terminal portion 50 has: an output terminal 51; and an intermediary member 52 that fastens the output terminal 51 to the positive electrode radiating fins 20.

The output terminal 51 is produced using an electrically conductive material such as iron, and has a head portion 51a and a shaft portion 51b, a knurled portion 51c being formed on a root portion of the shaft portion 51b (in a vicinity of the head portion 51a), and an external screw thread portion 51d being formed on an axial region that does not include the knurled portion 51c and a tip end portion of the shaft portion 51b.

The intermediary member 52 is produced using an electrically conductive material such as iron, and has: a cylindrical fastening seat 52a; and a nut portion 52b that is formed integrally on a first end of the fastening seat 52a. An inside diameter of the fastening seat 52a is formed so as to have a larger diameter than the external screw thread portion 51d, and an internal screw thread portion 52c that screws together with the external screw thread portion 51d is formed only on an inner circumferential surface of the nut portion 52b. In addition, an engaging recess portion 52d is formed around an entire circumference of an outer circumferential surface of the fastening seat 52a in a vicinity of the nut portion 52b. As shown in FIG. 15, a corner portion on an opposite side of the engaging recess portion 52d from the nut portion 52b is beveled around an entire circumference to form an inclined surface 52e.

As shown in FIGS. 3 through 5, the rear cover 30 is formed into a cup shape that includes a bottom portion 31 and an approximately cylindrical peripheral wall portion 32, using an electrically insulating resin such as polybutylene terephthalate (PBT), nylon 66, etc. The plurality of air intake apertures 30a and a single penetrating aperture 33 are formed on the floor portion 31. The penetrating aperture 33 is formed so as to have an approximately D-shaped aperture shape that has a flat portion 33a on one portion.

As shown in FIGS. 7 through 9, the bushing 40 is produced into a tubular shape in which an output wire positioning portion 41 and an interfitting insertion portion 42 are formed coaxially and continuously in an axial direction using an insulating resin such as a polyphenylene sulfide (PPS) resin, for example. Four recess portions 41a into which an engaging portion 25a of an external output wire 25 is inserted are formed by increasing an inside diameter of the output wire positioning portion 41 at a uniform angular pitch circumferentially.

The interfitting insertion portion 42 is produced into a tubular shape that has an approximately D-shaped external shape on a portion of an outer circumferential surface of which a flat surface 42a is formed, and that is slightly smaller than an internal shape of the penetrating aperture 33, and that has an inside diameter that is slightly larger than an outside diameter of the fastening seat 52a. In addition, engaging hooks 43 are formed in each of three notch portions that are formed by cutting away a peripheral wall portion of the interfitting insertion portion 42 at 90-degree spacing circumferentially other than in a region of formation of the flat surface 42a. The engaging hooks 43 include: a shaft portion 43a that extends axially at a circumferentially central position of each of the notch portions; and a hook portion 43b that is disposed so as to protrude radially inward from a tip end of the shaft portion 43a. Here, portions of root portions of the hook portions 43b that face radially inward are formed so as to have inclined surfaces 43c that displace radially inward toward tip ends. Furthermore, inside diameter dimensions of the shaft portions 43a of the three engaging hooks 43 are formed so as to be thinner than the peripheral wall portion of the interfitting insertion portion 42, and are set so as to be somewhat larger than the inside diameter of the interfitting insertion portion 42, and inside diameter dimensions of the hook portions 43b are smaller than the outside diameter of the fastening seat 52a, and larger than an outside diameter of a bottom surface of the engaging recess portion 52d.

In order to mount the rear cover 30, the bushing 40, and the output terminal portion 50 that are configured in this manner, the shaft portion 51b of the output terminal 51 is first passed through the penetrating aperture 20a that is disposed through the positive electrode radiating fins 20, and the knurled portion 51c is press-fitted into the penetrating aperture 20a. Next, the nut portion 52b of the intermediary member 52 is oriented toward the head portion 51a, and the nut portion 52b is fastened by screwing the internal screw thread portion 52c onto the external screw thread portion 51d. The positive electrode radiating fins 20 are thereby fixed by fastening between the head portion 51a and the nut portion 52b by the fastening force from the nut portion 52b, and the output terminal 51 is fastened to the positive electrode radiating fins 20.

Next, the brush holder 16, the rectifier 18, the voltage regulator, etc., are mounted axially outside the rear bracket 3. Then, the rear cover 30 is mounted onto the rear bracket 3 from axially outside while passing the shaft portion 51b of the output terminal 51 through the penetrating aperture 33. Next, the interfitting insertion portion 42 of the bushing 40 is aligned with the aperture shape of the penetrating aperture 33, and is pushed in so as to be fitted over the fastening seat 52a of the intermediary member 52. Thus, the flat surface 42a faces the flat portion 33a, and the bushing 40 moves toward the nut portion 52b. Here, the shaft portions 43a of the engaging hooks 43 are formed so as to be thin, and are easy to deform elastically. Thus, the shaft portions 43a of the engaging hooks 43 deform elastically and widen radially outward, and the tip ends of the hook portions 43b slide over the outer circumferential surface of the fastening seat 52a. Moreover, the penetrating aperture 33 is formed so as to have an aperture shape that avoids contact with the elastically deforming engaging hooks 43.

Then, when the hook portions 43b pass the inclined surface 52e and move toward the engaging recess portion 52d, the inclined surfaces 43c of the hook portions 43b slide over the corner portion on the opposite side of the inclined surface 52e from the nut portion 52b while the shaft portions 43a recover, until the hook portions 43b fit into the engaging recess portion 52d, as shown in FIG. 15. As shown in FIGS. 11 through 14, the bushing 40 is thereby mounted to the fastening seat 52a. At this point, the engaging hooks 43 engage with the engaging recess portion 52d, snap-fitting the bushing 40 and the intermediary member 52 such that axial movement of the bushing 40 is constrained. Because the inclined surfaces 43c of the hook portions 43 are pressed against the inclined surface 52e or the corner portion of the inclined surface 52e by the force of recovery of the shaft portions 43a, and a force that draws the bushing 40 toward the nut portion 52b arises, the bushing 40 is held against the intermediary member 52 elastically in an engaged state, suppressing wobbling of the bushing 40. The interfitting insertion portion 42, which has an approximately D-shaped external shape, is also inserted inside the penetrating aperture 33, which has an approximately D-shaped aperture shape, constraining rotation of the bushing 40 around its axis. In addition, an opposite end of the fastening seat 52a from the nut portion 52b protrudes axially outward from the bushing 40, as shown in FIG. 11.

The external output wire 25 is mounted to the fastening seat 52a of the intermediary member 52 such that the engaging portion 25a, which is formed by bending a tip end thereof, is inserted into one of the recess portions 41a that are formed on the output wire positioning portion 41 of the bushing 40. Then the fixing nut 26 is screwed onto the external screw thread portion 51d on the shaft portion 51b of the output terminal 51. By this fastening of the fixing nut 26, the external output wire 25 is fixed by fastening between the fastening seat 52a and the fixing nut 26, and is fastened to the intermediary member 52.

According to Embodiment 1, the bushing 40 is mounted to the intermediary member 52, which has greater rigidity, such that axial movement is constrained. Thus, when fastening the fixing nut 26 that is screwed onto the external screw thread portion 51d to fasten and fix the external output wire 25 onto the fastening seat 52a of the intermediary member 52, the bushing 40 is less likely to move axially, improving the mounting workability for the external output wire 25.

The bushing 40 is mounted to the intermediary member 52 by snap-fitting engagement between the engaging hooks 43 that are formed on the bushing 40 and the engaging recess portion 52d that is formed on the outer circumferential surface of the fastening seat 52a of the intermediary member 52. Thus, because the engaging hooks 43 can be fitted into the engaging recess portion 52d simply by mounting the bushing 40 so as to be fitted over the fastening seat 52a and pushing it inward in an axial direction of the fastening seat 52a, mounting of the bushing 40 is facilitated. In addition, because three engaging hooks 43 are formed at 90-degree spacing circumferentially, coaxiality between the fastening seat 52a and the bushing 40 that is mounted to the fastening seat 52a is improved, enabling the bushing 40 to be pushed in smoothly in the axial direction of the fastening seat 52a.

Portions of the root portions of the hook portions 43b of the engaging hooks 43 that face radially inward are formed so as to have inclined surfaces 43c that displace radially inward toward tip ends, and a corner portion on an opposite side of the engaging recess portion 52d from the nut portion 52b is beveled around an entire circumference to form an inclined surface 52e. Thus, because the snap-fitting engagement is released by pulling the bushing 40 that is snap-fitted onto the intermediary member 52 axially outward, such that the inclined surfaces 43c of the hook portions 43b slide over the corner portion of the inclined surface 52e on the opposite side of the engaging recess portion 52d from the nut portion 52b while the shaft portions 43a deform elastically, and the hook portions 43b come out of the engaging recess portion 52d, removal of the bushing 40 is facilitated.

The external output wire 25 is mounted to the end surface of the fastening seat 52a such that the engaging portion 25a, in which a tip end portion thereof is bent into an L shape, is inserted into one of the recess portions 41a that are formed on the end surface of the output wire positioning portion 41 of the bushing 40, and is mounted to the intermediary member 52 by fastening the fixing nut 26 that is screwed onto the external screw thread portion 51d. Rotation of the bushing 40 around the shaft of the intermediary member 52 is also constrained. Thus, the external output wire 25 is prevented from turning together when fastening the fixing nut 26, ensuring the fastening strength of the external output wire 25, and increasing connection reliability. In addition, because the fastening seat 52a protrudes axially out of the bushing 40, the bushing 40 is not interposed in the fastening portion of the external output wire 25 in a compressed state, and the fastening portion of the external output wire 25 is constituted only using a metal material. Thus, loosening of the fixing nut 26 that results from contraction, etc., of a resin is eliminated, increasing connection reliability.

Because the aperture shape of the penetrating aperture 33 of the rear cover 30 is an approximate D shape, and the external shape of the interfitting insertion portion 42 of the bushing 40 is an approximate D shape that matches the aperture shape of the penetrating aperture 33, rotation of the bushing 40 around the axis of the intermediary member 52 is constrained simply by mounting the bushing 40 to the intermediary member 52 by inserting it into the penetrating aperture 33. Consequently, a rotation-constraining mechanism for the bushing 40 can be achieved by a simple construction.

By forming the penetrating aperture 33 at a set position on the rear cover 30, the bushing 40, of which the interfitting insertion portion 42 is inserted into the penetrating aperture 33, can be mounted to the fastening seat 52a so as to be centered around the axial direction of the output terminal 51 in a state in which the recess portions 41a are accurately positioned at set angular positions. Thus, because the external output wire 25 is mounted to the end surface of the fastening seat 52a by inserting the engaging portion 25a into one of the recess portions 41a, the external output wire 25 can be mounted to the output terminal portion 50 at a set angle.

Moreover, in Embodiment 1 above, rotation of the bushing around its axis is constrained by making the aperture shape of the penetrating aperture and the external shape of the interfitting insertion portion of the bushing an approximate D shape, but the aperture shape of the penetrating aperture and the external shape of the interfitting insertion portion of the bushing are not limited to an approximate D shape, provided that they are non-circular. Furthermore, rotation of the bushing around its axis may be constrained by making the aperture shape of the penetrating aperture and the external shape of the interfitting insertion portion of the bushing a circular shape, forming a recess portion on one, forming a protruding portion on the other, and interfitting the recess portion and the protruding portion.

Embodiment 2

Figure 16:
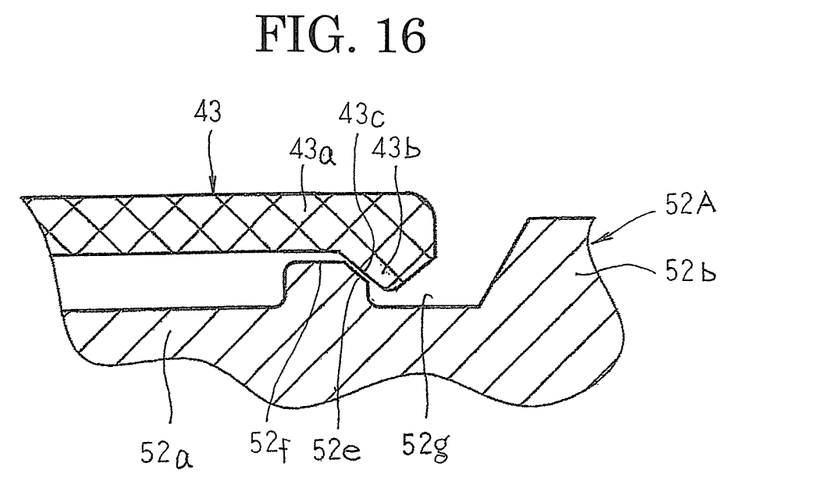
FIG. 16 is a partial cross section that explains a state of engagement between a bushing and an intermediary member in an automotive alternator according to Embodiment 2 of the present invention.

FIG. 16 is a partial cross section that explains a state of engagement between a bushing and an intermediary member in an automotive alternator according to Embodiment 2 of the present invention.

In FIG. 16, a projection 52f is formed around an entire circumference of an outer circumferential surface of a fastening seat 52a in a vicinity of a nut portion 52b. An engaging recess portion 52g is formed on a side of the projection 52f near the nut portion 52b.

Moreover, Embodiment 2 is configured in a similar or identical manner to that of Embodiment 1 above except that an intermediary member 52A is used on which the projection 52f is disposed instead of the engaging recess portion 52d.

In Embodiment 2, when the interfitting insertion portion 42 of the bushing 40 is pushed in so as to be fitted over the fastening seat 52a of the intermediary member 52A, the tip ends of the hook portions 43b slide over the outer circumferential surface of the fastening seat 52a, and the bushing 40 moves toward the nut portion 52b. Then, when the hook portions 43b move to the position of the projection 52f, the shaft portions 43a deform elastically, and are pushed apart, and the hook portions 43b ride over the projection 52f. Then, when the hook portions 43b cross over the projection 52f, the inclined surfaces 43c of the hook portions 43b slide over the corner portion on the opposite side of the inclined surface 52e from the nut portion 52b while the shaft portions 43a recover, until the hook portions 43b fit into the engaging recess portion 52g. As shown in FIG. 15, the bushing 40 is thereby mounted to the fastening seat 52a such that axial movement is constrained.

The snap-fitting engagement is released by pulling the bushing 40 that is snap-fitted onto the intermediary member 52A axially outward such that the inclined surfaces 43c of the hook portions 43b slide over the corner portion on the opposite side of the inclined surface 52e from the nut portion 52b while the shaft portions 43a deform elastically, and the hook portions 43b ride over the projection 52f. When the bushing 40 is pulled further axially outward, the tip ends of the hook portions 43b slide over the projection 52f. Then, once the hook portions 43b are past the projection 52f, the shaft portions 43a recover, and the bushing 40 can be pulled out.

Consequently, similar or identical effects to those in Embodiment 1 above are also exhibited in Embodiment 2.

Embodiment 3

Figure 17:
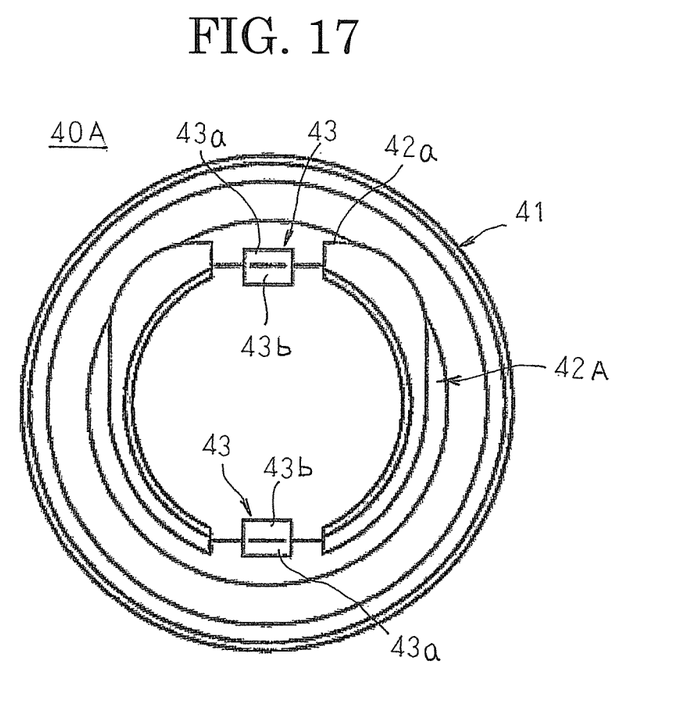
FIG. 17 is a rear elevation that shows a bushing that is used in an automotive alternator according to Embodiment 3 of the present invention.
Figure 18:
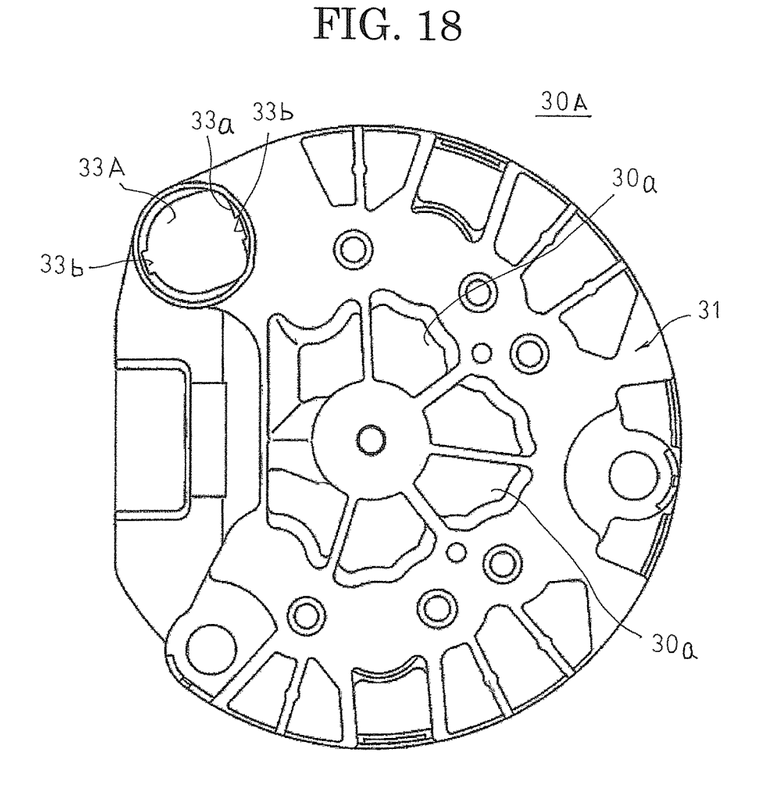
FIG. 18 is a front elevation that shows a rear cover that is used in the automotive alternator according to Embodiment 3 of the present invention.
Figure 19:
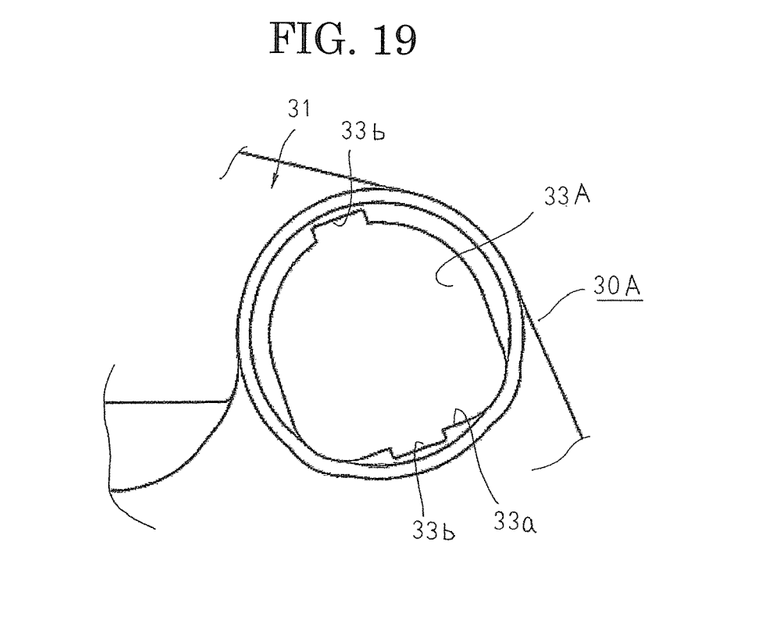
FIG. 19 is a partial oblique projection that shows a vicinity of a penetrating aperture of the rear cover that is used in the automotive alternator according to Embodiment 3 of the present invention.

FIG. 17 is a rear elevation that shows a bushing that is used in an automotive alternator according to Embodiment 3 of the present invention, FIG. 18 is a front elevation that shows a rear cover that is used in the automotive alternator according to Embodiment 3 of the present invention, and FIG. 19 is a partial oblique projection that shows a vicinity of a penetrating aperture of the rear cover that is used in the automotive alternator according to Embodiment 3 of the present invention.

As shown in FIG. 17, a bushing 40A is produced into a tubular shape in which an output wire positioning portion 41 and an interfitting insertion portion 42A are formed coaxially and continuously in an axial direction. The interfitting insertion portion 42A is produced into a tubular shape that has an approximately D-shaped external shape on a portion of an outer circumferential surface of which a flat surface 42a is formed, and that is slightly smaller than an internal shape of a penetrating aperture 33A that is described below, and that has an inside diameter that is slightly larger than an outside diameter of the fastening seat 52a. In addition, engaging hooks 43 are formed in each of two notch portions that are formed by cutting away a peripheral wall portion of the interfitting insertion portion 42A at a circumferentially central portion of a region of formation of the flat surface 42a, and at a circumferentially central portion of the peripheral wall portion of the interfitting insertion portion 42 other than in the region of formation of the flat surface 42a. The engaging hooks 43 include: a shaft portion 43a that extends axially at a circumferentially central position of each of the notch portions; and a hook portion 43b that is disposed so as to protrude radially inward from a tip end of the shaft portion 43a.

Here, inside diameter dimensions of the shaft portions 43a of the two engaging hooks 43 are set so as to be somewhat larger than the inside diameter of the interfitting insertion portion 42, and inside diameter dimensions of the hook portions 43b are smaller than the outside diameter of the fastening seat 52a, and larger than an outside diameter of a bottom surface of the engaging recess portion 52d. In addition, recess portions 33b are formed so as to have a depth that avoids contact with the elastically deforming engaging hooks 43 when the bushing 40A is being mounted to the fastening seat 52a.

In FIGS. 18 and 19, the rear cover 30A is formed so as to have a cup shape that includes a bottom portion 31 and an approximately cylindrical peripheral wall portion 32. A plurality of air intake apertures 30a and the single penetrating aperture 33A are formed on the floor portion 31. The penetrating aperture 33A is formed on so as to have an approximately D-shaped aperture shape that has a flat portion 33a on one portion. In addition, the recess portions 33b are formed on a circumferentially central position of the flat portion 33a, and on a circumferentially central portion of an inner circumferential wall of the penetrating aperture 33A other than in the region of formation of the flat portion 33a.

Moreover, Embodiment 3 is configured in a similar or identical manner to that of Embodiment 1 above except that the rear cover 30A and the bushing 40A are used.

In Embodiment 3, the rear cover 30A is mounted onto the rear bracket 3 from axially outside while passing the shaft portion 51b of the output terminal 51 through the penetrating aperture 33A. Next, the interfitting insertion portion 42A of the bushing 40A is aligned with the aperture shape of the penetrating aperture 33A, and is pushed in so as to be fitted over the fastening seat 52a of the intermediary member 52. Thus, the flat surface 42a faces the flat portion 33a, the engaging hooks 43 pass through the recess portions 33b, and the bushing 40A moves toward the nut portion 52b. Here, the shaft portions 43a of the engaging hooks 43 deform elastically and widen radially outward, and the tip ends of the hook portions 43b slide over the outer circumferential surface of the fastening seat 52a.

Then, when the hook portions 43b pass the inclined surface 52e and move toward the engaging recess portion 52d, the inclined surfaces 43c of the hook portions 43b slide over the corner portion on the opposite side of the inclined surface 52e from the nut portion 52b while the shaft portions 43a recover, until the hook portions 43b fit into the engaging recess portion 52d, whereby the bushing 40A is mounted to the fastening seat 52a. At this point, the engaging hooks 43 engage with the engaging recess portion 52d such that axial movement of the bushing 40A is constrained. The interfitting insertion portion 42A, which has an approximately D-shaped external shape, is also inserted inside the penetrating aperture 33A, which has an approximately D-shaped aperture shape, constraining rotation of the bushing 40A around its axis.

Snap-fitting engagement is released by pulling the bushing 40 that is snap-fitted onto the intermediary member 52 axially outward, such that the inclined surfaces 43c of the hook portions 43b slide over the corner portion of the inclined surface 52e on the opposite side of the engaging recess portion 52d from the nut portion 52b while the shaft portions 43a deform elastically, and the hook portions 43b come out of the engaging recess portion 52d.

Consequently, similar or identical effects to those in Embodiment 1 above are also exhibited in Embodiment 3.

Moreover, in each of the above embodiments, cases in which the present invention is applied to an automotive alternator have been explained, but similar effects are also exhibited when the present invention is applied to other automotive rotary electric machines such as automotive electric motors or automotive generator-motors.

In each of the above embodiments, cases in which two or three engaging hooks of a bushing are formed so as to be separated in a circumferential direction have been explained, but the number of engaging hooks is not limited to two or three, and may be four or more. Furthermore, the number of engaging hooks may be one if sufficient force to constrain axial movement of the bushing can be obtained from a single engaging hook.

The invention claimed is:

1. An automotive rotary electric machine comprising:
 a rectifier that is fixed to an axially outer end surface of a bracket;
 a protective cover that is mounted to said bracket so as to cover said rectifier;
 an output terminal portion that is fastened to a positive electrode output end of said rectifier, and that protrudes axially out of a penetrating aperture that is formed on said protective cover; and
 a bushing that is inserted into said penetrating aperture, and that is also mounted to said output terminal portion to insulate and protect said output terminal portion,
 wherein:
 said output terminal portion comprises:
  an output terminal that includes:
   a shaft portion on which an external screw thread portion is formed; and
   a head portion that is formed integrally on a first axial end of said shaft portion; and
  an intermediary member that includes:
   a nut portion that is screwed onto said external screw thread portion to fix said positive electrode output end by fastening against said head portion; and
   a fastening seat on a first axial end of which said nut portion is formed integrally, and that is mounted so as to be fitted over said shaft portion such that a second axial end protrudes axially out of said bushing;
 said bushing is axially fixed directly to said intermediary member such that axial movement of said bushing is constrained; and
 an external output wire is mounted to a second axial end surface of said fastening seat in a state of contact by a fastening force from a fixing nut that is screwed onto said external screw thread portion such that said external output wire is fixed by fastening between said fixing nut and said fastening seat.

2. The automotive rotary electric machine according to claim 1, wherein said bushing is mounted to said intermediary member by snap-fitting engagement.

3. The automotive rotary electric machine according to claim 2, wherein said snap-fitting engagement is configured such that a hook portion of an engaging hook that is formed on said bushing fits into an engaging recess portion that is formed on an outer circumferential surface of said fastening seat.

4. The automotive rotary electric machine according to claim 3, wherein a plurality of said engaging hooks are disposed so as to be separated from each other circumferentially around said bushing.

5. The automotive rotary electric machine according to claim 1, wherein said bushing is constrained by said protective cover from rotating around an axis of said fastening seat.

* * * * *